(12) United States Patent
Wei et al.

(10) Patent No.: US 7,264,880 B2
(45) Date of Patent: *Sep. 4, 2007

(54) FLUORESCENT ARTICLES HAVING MULTIPLE FILM LAYERS

(75) Inventors: Guang-Xue Wei, Deerfield, IL (US); Drew J. Buoni, Chicago, IL (US); Kimberly A. Dockus, Woodridge, IL (US)

(73) Assignee: Avery Dennison Corporation, Pasadena, CA (US)

( * ) Notice: Subject to any disclaimer, the term of this patent is extended or adjusted under 35 U.S.C. 154(b) by 324 days.

This patent is subject to a terminal disclaimer.

(21) Appl. No.: 10/135,537

(22) Filed: Apr. 30, 2002

(65) Prior Publication Data

US 2003/0203211 A1 Oct. 30, 2003

(51) Int. Cl.
*B32B 27/00* (2006.01)
*B32B 27/36* (2006.01)

(52) U.S. Cl. ...................... 428/412; 428/500

(58) Field of Classification Search ............... 428/412, 428/500; 359/529; 404/94
See application file for complete search history.

(56) References Cited

U.S. PATENT DOCUMENTS

| | | | |
|---|---|---|---|
| 3,830,682 A | 8/1974 | Rowland | |
| 4,486,363 A | 12/1984 | Pricone et al. | |
| 4,601,861 A | 7/1986 | Pricone et al. | |
| 5,005,873 A | 4/1991 | West | |
| 5,117,304 A | 5/1992 | Huang et al. | |
| 5,387,458 A | 2/1995 | Pavelka et al. | |
| 5,605,761 A | 2/1997 | Burns et al. | |
| 5,614,286 A | 3/1997 | Bacon, Jr. et al. | |
| 5,672,643 A | 9/1997 | Burns et al. | |
| 5,674,622 A | 10/1997 | Burns et al. | |
| 5,754,337 A | 5/1998 | Burns et al. | |
| 5,920,429 A | 7/1999 | Burns et al. | |
| 6,001,936 A | 12/1999 | Barrera et al. | |
| 6,015,214 A | 1/2000 | Heenan et al. | |
| 6,110,566 A | 8/2000 | White et al. | |
| 6,251,963 B1 * | 6/2001 | Kohler et al. | 522/64 |
| 6,312,132 B1 | 11/2001 | Pavelka et al. | |
| 6,375,776 B1 | 4/2002 | Buoni et al. | |
| 6,464,898 B1 * | 10/2002 | Tomoike et al. | 252/301.35 |
| 2003/0203212 A1 * | 10/2003 | Wei et al. | 428/412 |

FOREIGN PATENT DOCUMENTS

| | | |
|---|---|---|
| EP | 1 008 440 A2 | 6/2000 |
| GB | 2 300 596 A | 11/1996 |
| WO | WO98/14802 | 4/1998 |
| WO | WO99/48961 | 9/1999 |
| WO | WO 00/47407 | 8/2000 |

OTHER PUBLICATIONS

PCT International Search Report—PCT/US03/10841, Apr. 4, 2003.
PCT International Search Report—PCT/US03/10842, Apr. 4, 2003.

* cited by examiner

*Primary Examiner*—Thao Tran
(74) *Attorney, Agent, or Firm*—Cook, Alex, McFarron, Manzo, Cummings & Mehler, Ltd.

(57) ABSTRACT

Articles are provided which have fluorescent properties and which are suitable for use in making retroreflective articles such as safety and informational signage. The articles have at least two film layers, each film layer including a colorant dye. The multiple film layer sheeting exhibits excellent resistance to weathering and overall color durability while also providing chromaticity properties dictated by industry standards for a particular coloration. A method of preparing the articles is provided. In a particular application, the articles embody retroreflective properties and are informational for safety signage articles such as pedestrian crossing and school safety fluorescent yellow green signs.

38 Claims, 5 Drawing Sheets

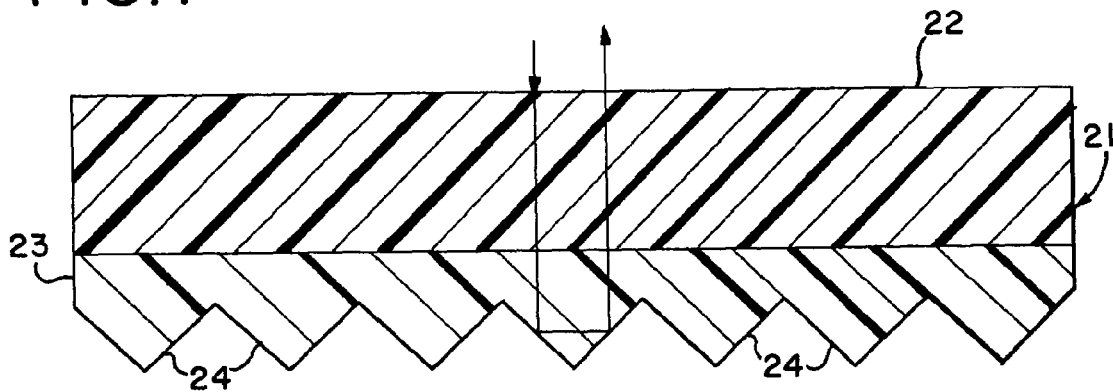
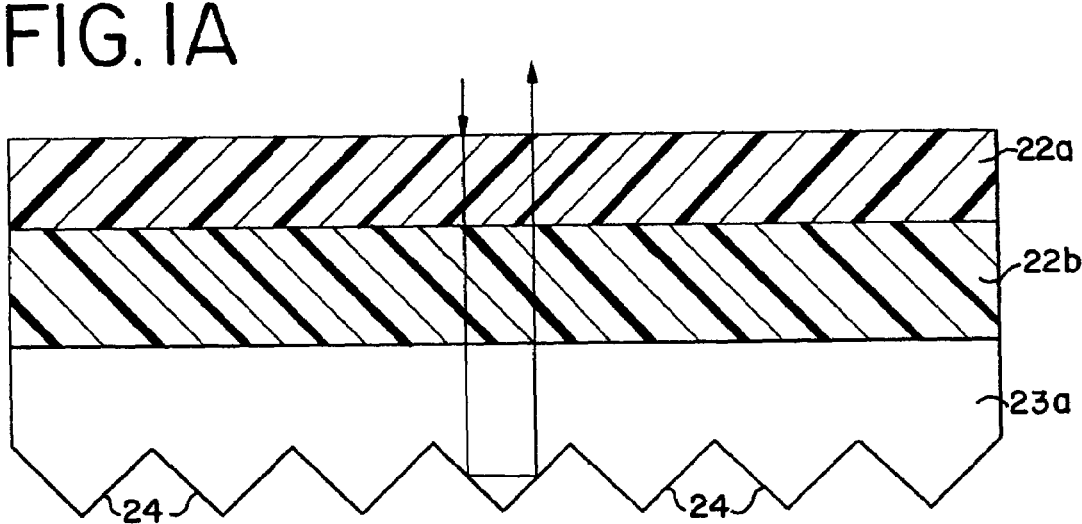
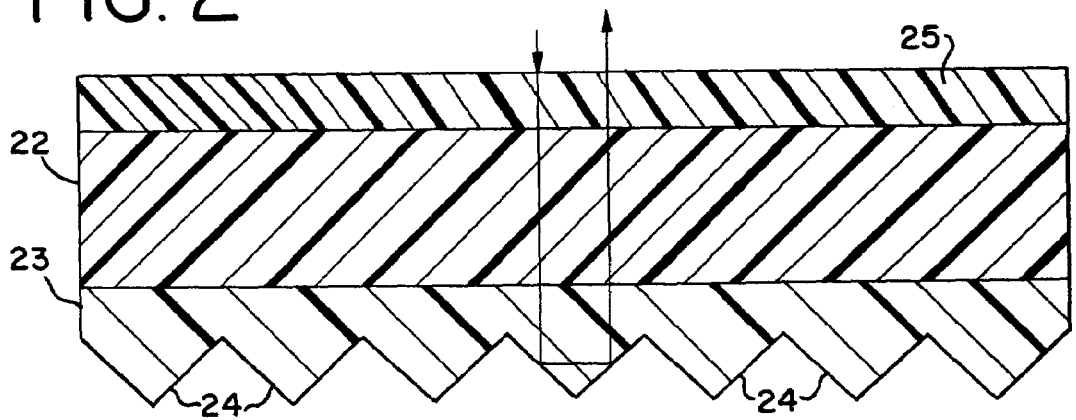

US 7,264,880 B2

FLUORESCENT ARTICLES HAVING MULTIPLE FILM LAYERS

BACKGROUND OF THE INVENTION

1. Field of the Invention

This invention generally relates to polymers having fluorescent colorants. More particularly, the invention relates to articles having fluorescent properties and being composed of multiple layers which together provide important properties. Such properties provide desired brightness and chromaticity which shows excellent resistance to weathering and/or overall color durability.

2. Description of Related Art

Articles incorporating fluorescent dyes into polymeric matrices are extensively known in the art for various applications including signage, vehicle markings roadway markings, and other applications where high visibility is desired and beneficial for any number of reasons, including safety, information dissemination, visibility, visual signaling, and quick detection. In some applications, it is important to meet and maintain certain color standards and/or certain durability standards.

Often these polymer systems containing fluorescent colorants are structured in the form of a sheeting which exhibits fluorescing properties. Particularly suitable applications for these types of films loaded with fluorescent colorants are in connection with uses where signaling is a primary function of the article. Typically, these take the form of signage which can benefit by exhibiting fluorescing action. Traffic safety and informational signs have been known to incorporate films having fluorescent colorants which enhance visibility of the signs. These include traffic signs for various modes of transportation, highway safety visual signaling articles, reflectors, roadway markers, highway markers, street signage, and other types of articles which can benefit from enhanced visibility. Certain types of signage need to have long-term durability, which is a big hurdle because most fluorescent colorants have poor ultraviolet light stability. Some of these articles incorporate retroreflective features.

Over the years, the art has developed within the field of retroreflective articles. Generally speaking, there are three main types of retrorefelctive sheetings in the traffic industry, i.e. enclosed lens sheeting, encapsulated lens sheeting, and prismatic sheeting. Palmquist U.S. Pat. No. 2,407,680 illustrates so-called enclosed lens retroreflective sheeting articles. Assemblies of this type are also known as engineering grade, utility grade or super engineering grade products, and they have a typical coefficient of retroreflection at a $-4°$ entrance angle and at a $0.2°$ observation angle between 50 to 160 $cd/lx/m^2$ for white sheeting, depending upon the specific product.

McKenzie U.S. Pat. No. 3,190,178 generally illustrates so-called encapsulated lens retroreflective articles. This includes sheeting of beads encapsulated into polymer, at times referred to as high intensity products. For white sheeting, these have a typical coefficient of retroreflection of about 300 $cd/lx/m^2$.

A third general category of retroreflective sheeting incorporates microprismatic optical elements which provide exceptional reflectivity, typically between about 400 and about 1600 $cd/lx/m^2$ depending upon the specific product construction and geometry of the cube corner elements. Cube corner retroreflective sheetings are described in Rowland U.S. Pat. No. 3,684,348, Hoopman U.S. Pat. No. 4,588,258, Burns U.S. Pat. No. 5,605,761, and White U.S. Pat. No. 6,110,566. Publications such as Rowland U.S. Pat. No. 3,810,804, and Pricone U.S. Pat. Nos. 4,601,861 and 4,486,363 illustrate the manufacture of articles of this type. It will be noted that the art includes retroreflective sheeting by which thermoplastics are embossed into prismatic sheeting. The present invention finds application in products having these principal types of retroreflective construction.

Other art teaches the use of an ultraviolet (UV) light screening layer over or in front of a fluorescent layer. This art includes Japanese Patent Publication No. 2-16042 (Application No. 63-165914) of Koshiji, Phillips PCT Publication No. WO99/48961 and No. WO00/47407, and Pavelka U.S. Pat. No. 5,387,458. The Japanese Publication indicates that UV additives are useful to protect fluorescent sheeting. The PCT publications relate to fluorescent polyvinyl chloride (PVC) film with a UV light screening layer having UV additives which screen 425 nanometers (nm) and lower. This U.S. Pat. No. 5,387,458 incorporates a UV screening layer for a film of selected polymers containing selected fluorescent dyes.

The art recognizes other methods of enhancing the durability of fluorescent colors by using stabilizers of the hindered amine light stabilizer type (HALS type). Art in this area includes Burns U.S. Pat. No. 5,605,761 and White U.S. Pat. No. 6,110,566. The former proposes the combination of particular fluorescent dyes and HALS in a polycarbonate matrix. The latter proposes low molecular weight HALS and a thioxanthene dye within a solventless PVC resin.

All of these patents, other art and patent publications, and any others identified herein, are incorporated by reference hereinto.

To a certain extent, art of this type recognizes that making retroreflective signs fluorescent provides enhanced visibility under most lighting conditions. The characteristic bright color and/or the fluorescing characteristics of fluorescent materials attract ones eye to the fluorescent signage or other article. For example, outdoor signage articles which are colored with fluorescent colorants enhance visual contrast, making the materials more conspicuous than non-fluorescent colors. When such signage is intended for outdoor uses, two major hurdles are encountered. One is durability under outdoor conditions, and the other is the availability of specific colors.

A common practice directed toward enhancing outdoor durability is using a UV screening layer such as that taught by the art noted above in an attempt to protect the base fluorescent polymeric matrix layer. Traditionally, such a UV light screening layer is made by dissolving UV light absorbing compounds into a transparent polymeric matrix. The art discloses fluorescent articles consisting of a UV light screening layer deposited in front of a fluorescent color layer. The UV screening layer is intended to absorb a defined range of UV light. UV light has a wavelength range of from 290 nm to 380 nm. Certain art also suggests moving somewhat into the visible range, such as up to about 400 nm or 410 nm and below. Often, approaches such as these fail to consider and/or address potential interaction between the UV absorber in the screening layer and the fluorescent dye within the underlying colored layer.

Most fluorescent colorants have poor UV light stability. In some cases, fading of fluorescent sheeting due to UV light exposure dramatically shortens the useful life of articles such as fluorescent traffic and roadway signs. While UV screening is intended to address the outdoor durability problem, several difficulties can arise. One concern is that the UV light absorbing compounds of these screening layers can leach out with time or can diffuse or migrate into the underlying fluorescent layer. This diffusion can actually accelerate fading of the fluorescent colorant in certain instances.

Art such as Burns U.S. Pat. No. 5,605,761 and White U.S. Pat. No. 6,110,566 propose fluorescent sheeting articles of these patents which do not necessarily incorporate a separate UV screening layer. Typically, these teach particular combinations of polymers and fluorescent dyes, often together with HALS materials, in the same film. In particular, the former patent discloses fluorescent articles comprising fluorescent dye and HALS within a polycarbonate matrix. The latter patent purports to teach that the combination of a fluorescent thioxanthene dye and a HALS material in a solventless PVC matrix enhances light stability of the fluorescent colors in the PVC system.

Acrylic polymers have advantages over polymers such as polycarbonate. Typical in this regard is polymethylmethacrylate (PMMA). Compared to other polymers such as polycarbonate, such acrylics are inexpensive, easier to process and are less susceptible to UV light degradation. For example, after a few years of outdoor exposure, polycarbonate can develop a hazy and/or yellow appearance. Acrylics, however, can withstand such outdoor weathering for a significantly longer time before the development of such defects.

Certain prior art teaches that acrylic polymers are not suitable for hosting a fluorescent dye. For example, Pavelka U.S. Pat. No. 5,387,458 discloses fluorescent articles comprising fluorescent dyes dispersed in various polymeric matrices. This teaches that fluorescent durability of fluorescent dyes in PMMA is poor even with a UV screening overlayer. Burns U.S. Pat. No. 5,605,761 discloses fluorescent articles comprising specific fluorescent dyes and a HALS compound in both polycarbonate and PMMA. The patent teaches incorporation of the HALS compound into the polycarbonate matrix significantly increases the fluorescent durability of the resulting articles, but does not have the same effect with PMMA. Art references such as these conclude that PMMA is not a suitable polymer matrix for fluorescent dyes because such acrylic based articles do not exhibit good fluorescence durability when exposed to extended outdoor weathering.

At the present state of the art, although fluorescent acrylic articles appear to hold some promise, issues concerning color stabilization and/or fluorescent stabilization against ultraviolet radiation present a problem of substantial proportions. Ideally, if a solution could be found without the need for placement of a separate UV light screening and/or absorbent layer over the article, such a solution is potentially all the more important and valuable. Addressing these problems are especially important for articles to be used under outdoor conditions which subject the article to lengthy exposure to sunlight.

Turning now to the problem of providing articles which comply with coloration standards, requirements, or needs, coloration considerations present a formidable challenge to suppliers of fluorescent articles, especially those which also must be very durable. This is the case whether addressing governmental coloration regulations, or industry standards.

In this regard, it is suggested here that there are three basic approaches for obtaining a desired fluorescent color in the typical instance when a given loading of available fluorescent dyes does not achieve the target fluorescent coloration. One approach is to adjust the loading quantity of the colorant. Often this solution is simply not adequate.

A second approach is to blend multiple fluorescent dyes together. Such an approach raises serious compatibility issues, both between the dyes themselves and between one or both of the dyes and the polymer matrix within which they would be loaded. Light durability also is an issue. Different dyes have different compatibility with different polymers due to differences between or among chemical structures. Durability of a given fluorescent colorant is different in different polymer matrices. One dye may have unfavorable interactions with another dye within a polymer matrix. Also, even the same dye can have different light durability in different polymer matrices.

The third possible approach is for the polymer matrix to contain a blend of a non-fluorescent dye with a fluorescent dye. The issues noted above for multiple fluorescent dyes in the same polymer matrix are raised for this option as well. The issues could be even more difficult due to the typical greater chemical difference between a fluorescent dye and a non-fluorescent dye. Additionally, there is a chance that the non-fluorescent dye may interfere with the fluorescent properties of the fluorescent dye, which may dramatically reduce brightness of the sheeting. A non-fluorescent dye can quench the overall fluorescing of the fluorescent dye.

Accordingly, the current state of the art also is in need of a solution to this coloration problem. Typically, the provider of such articles does not have the ability to solve this coloration problem by dictating coloration. Usually coloration is dictated to the user, and dye color availability is limited by dye suppliers.

It will be appreciated that attempting to address the two basic problems of light durability and coloration compliance within the same article increases the difficulties of these problems. Yet, a viable solution to these problems is all the more valuable when the same article successfully addresses both types of problems.

SUMMARY OF THE INVENTION

In accordance with the present invention, articles are provided which achieve fluorescent coloration which can be manipulated to realize target coloration needs while at the same time being light stable, particularly against ultraviolet radiation. The invention uses a multi-layer approach. At least two layers, such as films, are provided, one on top of the other. Each includes a dye or pigment. In many applications, multiple layers will each contain a fluorescent dye. One of the layers embodies a highly UV-light resistant and durable polymer such as acrylic or polyarylate. Preferably this is a layer which overlies another layer; that is, this first layer lies between the second layer and the environment or source of UV radiation. When viewed from the environment, the coloration exhibited by the combined dyed layers provides coloration parameters needed to meet a target coloration dictated by a given standard.

A general object of the present invention is to provide products or articles which are UV light stable and achieve desired coloration, as well as a method for preparing such products or articles.

An aspect of the present invention is that it provides improved fluorescent coloration articles which achieve desired coloration values while presenting durability attributes that are extremely well suited for exterior or outdoor usage, including under a variety of weather conditions.

Another aspect of this invention is that it provides an improved product and method which incorporate the use of multiple film layers that are suitable for use as fluorescent laminate of retroreflective sheeting for various uses.

Another aspect of the present invention is that it provides an improved fluorescent colored retroreflective sheeting suitable for use in manufacturing traffic safety and informational signage.

Another aspect of the present invention is that it can provide light-stable fluorescent yellow-green retroreflective sheeting for school zone crossing signs, pedestrian crosswalk signs and the like which provide coloration desired for signage of this type.

Another aspect of this invention is that it provides an approach for utilizing weatherable polymers such as acrylic polymer matrices in a fluorescent system which is both light stable and strong enough for extended-time use under harsh environmental conditions such as those encountered by signage in outdoor use.

Another aspect of this invention is that the articles provided are composed of multiple layers which alone are unsuitable, but together are suitable to create a light-durable, properly colored article.

Another aspect of the present invention is the providing of a dual film which exhibits fluorescent coloration for retroreflective sheeting that has suitable durability and coloration when the dual sheets are combined but not when they are used separately.

Another aspect of the present invention is the providing of a dual film which provides fluorescent yellow-green coloration for retroreflective sheeting that has suitable durability and coloration when the dual sheets are combined but not when they are used separately.

Other aspects, objects and advantages of the present invention will be understood from the following description according to preferred embodiments of the present invention, relevant information concerning which is shown in the accompanying drawings.

BRIEF DESCRIPTION OF THE DRAWINGS

In the course of this description, reference will be made to the attached drawings, wherein:

FIG. 1 is a cross-sectional illustration of fluorescent sheeting having multiple colored film layers showing an overlayer containing a fluorescent dye and an underlayer having a colorant and microprismatic retroreflective elements formed thereinto;

FIG. 1A is a cross-sectional illustration of fluorescent sheeting having multiple colored film layers over clear microprismatic retroreflective elements;

FIG. 2 is a cross-sectional illustration of fluorescent sheeting having multiple film layers and including an external supplemental protective layer;

DESCRIPTION OF THE PREFERRED EMBODIMENTS

Figure 3:
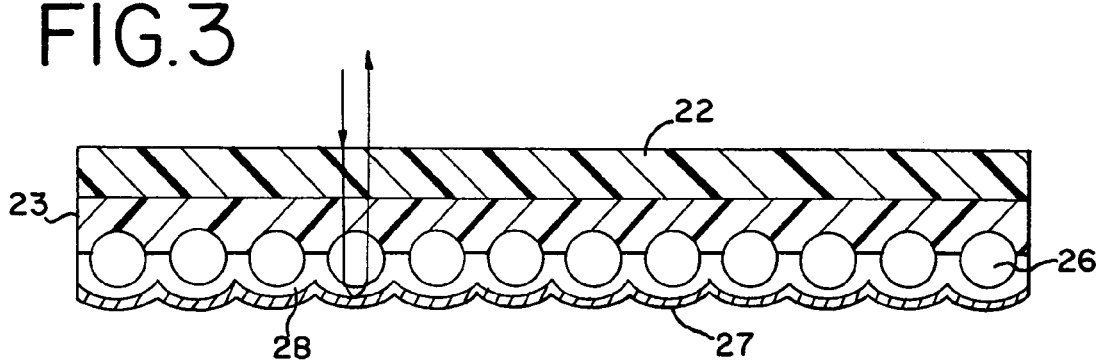
FIG. 3 is a cross-sectional illustration of an enclosed lens retroreflective sheeting material embodiment of the invention where the fluorescent sheeting having multiple film layers is disposed over an enclosed lens structure.

The present invention is directed toward fluorescent sheeting having multiple film layers which provide superior light stability and target fluorescent coloration parameters. Various embodiments of the invention are illustrated in the drawings. In each instance, an overlayer polymer having a fluorescent dye is combined with an underlayer of a polymer matrix having coloration attributes which combine with the overlayer to provide the target coloration and superior light stability.

FIG. 1 illustrates multiple layered film sheeting, generally designated as 21. This sheeting material is embodied in retroreflective form. An overlayer 22 and an underlayer 23 are shown. Each layer includes a dye, preferably a fluorescent dye. In this embodiment, the dyed underlayer 23 itself has retroreflective elements.

In other embodiments retroreflective elements such as those shown in this embodiment can be undyed or clear. For example, in FIG. 1A, a retroreflective layer 23a is provided which is made of a clear polymer which is suitable for embossing or forming corner cubes. With this arrangement, the multiple layers of dyed polymer are a separate overlayer 22a and underlayer 22b, neither of which has any reflective elements.

Underlayer 23 or layer 23a has a multiplicity of microprismatic retroreflective elements disposed on the rear surface of this layer. These retroreflective elements are known in the art and are described in such references as Hoopman U.S. Pat. No. 4,588,258 and Appledorn U.S. Pat. No. 4,775,219. This prismatic construction can be manufactured in accordance with Rowland U.S. Pat. No. 3,810,804 and Pricone U.S. Pat. Nos. 4,486,363 and 4,601,861, for example. Any suitable process and equipment can be used to form the microprismatic retroreflective elements 24 on the underlayer 23 or layer 23a, or otherwise provide them on this layer.

The retroreflective feature provided by the microprismatic elements 24 is illustrated by the arrowed light pattern shown in FIG. 1 and FIG. 1A. For simplicity of illustration, only two dimensions of this three-dimensional reflection are illustrated. This simplified light pattern shows an incident beam reflected twice by the article to provide the parallel reflected beam.

FIG. 2 shows a similar retroreflective multiple layer film. This embodiment adds a cap or cover layer 25. This is added when there is a need for enhanced scratch resistance, graffiti protection and/or added UV screening properties. In general, this cover layer 25 is conventional in formulation and manner of application. Such a cap or cover layer may be selected to have properties desirable for the front surface of a sign or the like, such as dew resistance and/or ease of printing.

Typically, the layers are laminated together such as by heat and/or pressure application by conventional equipment. Depending upon the particular needs or desires of the multiple layered film sheeting according to the invention, optional tie layers could be presented between layers. A laminating adhesive could be included to the extent deemed necessary for a particular construction or end use needs. Whenever included, any such tie layer or layers should be selected so as to not significantly detract from the properties to which the multiple layered fluorescent article according to the invention is directed.

A surface of one or more of the layers can be pre-printed with desired indicia so that a finished laminar or multiple-layered structure has the desired indicia on an inner surface, such as disclosed in U.S. Pat. Nos. 5,213,872 and 5,310,436. Other variations along these lines will be apparent to those skilled in the art of retroreflective sheeting or other alternative structural arrangement of interest for articles according to the invention.

One such other structural arrangement is illustrated in FIG. 3. This illustrates how the present invention can be incorporated into an enclosed lens retroreflective sheeting article. Enclosed lens retroreflective sheeting is well known in the art, an early teaching in this regard being Palmquist U.S. Pat. No. 2,407,680. This technology can incorporate lenses such as glass microspheres embedded in a sheeting structure with a flat, transparent cover film. In the embodiment of FIG. 3, glass microspheres 26 are embedded in underlayer 23. A specularly reflective layer 27 is provided in accordance with known art; for example, this may be vacuum deposited aluminum. The retroreflective nature of this enclosed lens structure is illustrated by the simplified two-dimensional arrowed light beam path which is shown to pass through the overlayer 22, the underlayer 23, into and through the microspheres, into and through the medium 28, and back.

It is also possible to have this overlayer 22 and underlayer 23 laminated together and have an adhesive layer (not shown) which is transparent to join the beads 26 and the underlayer. In this instance, the beads are embedded in the adhesive much as the underlayer 23 embeds the tops of the beads in FIG. 3.

Figure 4:
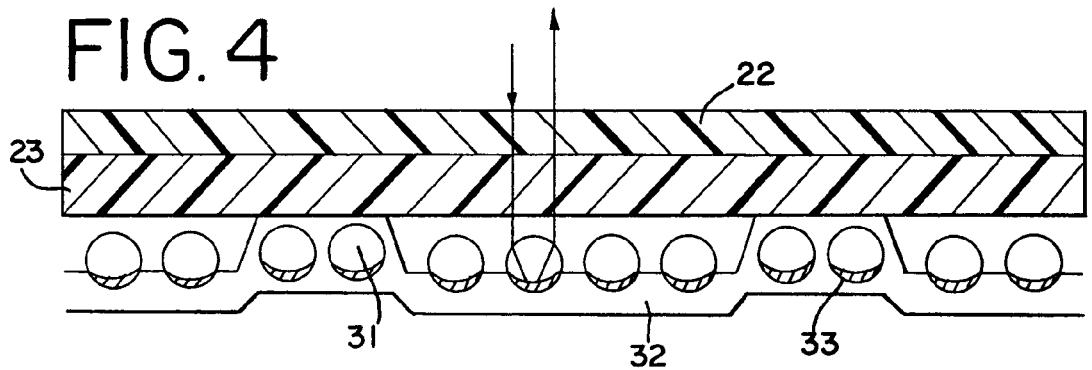
FIG. 4 is a cross-sectional illustration of an encapsulated lens retroreflective sheeting material embodiment of the invention where the fluorescent sheeting having multiple film layers is disposed over an encapsulated lens structure.

FIG. 4 illustrates how the present invention can be incorporated into an encapsulated lens retroreflective article. The encapsulated lens sheeting retroreflective features and structure are well known in the art. A mono layer of lenses such as glass microspheres is partially embedded in a binder layer, with the films sealed to the binder layer such that the lenses are encapsulated within hermetically sealed cells. In the illustrated embodiment, glass microspheres 31 are embedded in binder layer 32. The underlayer 23 is sealed to the binder layer to hermetically seal the lenses. The illustrated lenses 31 have their own reflective surfaces 33 to provide reflection according to the pattern indicated by the arrowed light path which is illustrated in FIG. 4.

A fluorescent article according to the invention incorporates multiple polymer matrices. A fluorescent dye is included in one or both of the overlayer and underlayer. Preferably, a fluorescent dye is included in a polymer matrix of overlayer 22 and within the polymer matrix of underlayer 23. In a typical article, the dye in each separate layer is different. This facilitates an important feature of the present invention to provide a multiple layer film which exhibits the fluorescent color needed for a particular application without having to physically place the dyes in the same matrix.

Matrix polymers can be varied. Examples include polycarbonates, polyesters, polystyrenes, styrene-acrylonitrile copolymers, polyurethanes, polyvinyl chloride, polymers formed from acrylic resins, polyarylates, copolyestercarbonates, and copolymers and combinations thereof. The overlayer and underlayer can be of different polymers.

The overlayer is a weatherable polymer including acrylic polymers, polyarylates, copolyestercarbonates, and copolymers and combinations thereof. In a preferred aspect of the invention, the overlayer polymer is formed from an acrylic resin. The underlayer need not be particularly weatherable and can be of a type in need of protection from weathering in harsher conditions. A preferred underlayer polymer is polycarbonate. In addition to providing the matrix structure for the overlayer, acrylic resins can be suitable for use in the underlayer.

Polymers including polyarylates and other matrix types and included components are discussed in greater detail in our pending U.S. patent applications Ser. Nos. 09/710,510 and 09/710,560, each filed Nov. 9, 2000. These disclosures are incorporated hereinto by reference.

Other, generally known components can be included in either or both the overlayer and underlayer. These are UV absorbers and HALS components. One or more of either or both can be included in any given polymer matrix.

The polymer matrix makes up a substantial percent by weight of the layers. The polymer component ranges between about 90 and about 99.99 weight percent of the formulation making up each polymer matrix, preferably between about 95 and about 99 weight percent. Each dye is present at a level of between about 0.01 and about 1.5 weight percent of the total weight of each matrix formulation, preferably between about 0.02 and about 1.0 weight percent. When present, a UV absorber is provided at levels between about 0.1 and about 5 weight percent, preferably between about 0.3 and about 3 weight percent, based upon the total weight of the polymer matrix formulation. When a HALS component is present, it will be at between about 0.1 and about 2 weight percent, preferably between about 0.3 and about 1.5 weight percent, based upon the total weight of the formulation making up each polymer matrix.

When an acrylic matrix is to be provided, it is generally preferred that the acrylic resin be formulated to minimize the amounts of performance enhancers such as impact modifiers or internal lubricants and the like. It also is believed to be useful if the amount of acrylic monomer present be minimized. Without being bound by any particular theory, it is believed at the present time that such performance enhancers or residual monomers can negatively impact a fluorescent colorant in an acrylic matrix, thereby potentially accelerating fluorescence degradation upon exposure to light, primarily UV-light. It is presently believed that this effect is heightened when combined with moisture, thermal cycling and ultraviolet radiation. Polymethyl methacrylate is a preferred acrylic resin. A particular acrylic resin which responds to these objectives is sold under the trade designation "ZKV-001E" from Cyro Industries. Other possible resins exist, such as Plexiglas PSR-9, available from Atofina.

Preferably, coloration is provided in each of the overlayer and underlayer by a fluorescent dye. Dyes in this regard include benzoxanthenes, benzothiazines, perylene imides, thioxanthenes, thioindigoids, naphthalimides and coumarins. Combining films with dyes having different coloration properties has been found to be useful according to the invention in order to create an article of a fluorescent color which can be tailored to meet certain real or perceived industry needs.

Dyes of the benzoxanthene type have been found to be particularly suitable for inclusion within the overlayer component according to the present invention. A particularly preferred fluorescent benzoxanthene dye is the yellow-green dye available under the trade name "Lumofast Yellow 3G" from DayGlo Color Corporation. Multiple versions of this dye may exist. When included within a polymethyl methacrylate matrix of an overlayer according to the invention, such a dye gives excellent daytime luminance. It can be used in a range of about 0.2 to about 1.5 weight percent, preferably in the range of about 0.3 and about 1.3 weight percent, based upon the total weight of the matrix formulation. The weight loading of the fluorescent dye will depend upon the thickness of the sheet and the desired color intensity for a particular end use. For example, retroreflective articles generally require that this fluorescent dye should be of sufficient transparency such that the retroreflective function of the article is not significantly impaired.

Another class of dyes which finds particular application in the present articles are benzothiazine dyes. It has been found that very useful yellow green fluorescent coloration and chromaticity is provided within the context of the multiple layered articles when using Huron Yellow D-417 available from DayGlo Color Corporation. The combination of this dye in the underlayer and a benzoxanthene yellow green dye in the overlayer results in coloration and chromaticity values which fall well within industry standards for yellow green sheeting.

Colors other than yellow green can be achieved with different coloration accommodations. For example, the underlayer can include fluorescent orange and/or red colorations. A thioxanthene dye of use in this regard is Marigold Orange D-315, available from DayGlo Color Corporation. Others are Lumogen F Orange 240 and Lumogen F Red 300, each being perylene imides available from BASF. Another is Lumogen F Yellow 170 of BASF. Fluorescent blue and green dyes also can be utilized. Other dyes include perylene esters and thioindigoid dyes.

It is believed that the inclusion of the UV absorbers in the layers can delay or prevent degradation of the fluorescent dye component. Particularly, it is believed that suitable benzotriazoles, benzophenones, and oxalanilides are UV absorbers which may delay fading of fluorescent dyes and enhance fluorescent durability.

Benzotriazole UV absorbers are valuable within fluorescent colored polycarbonate matrix systems, particularly in the underlayer of multiple layered articles. UV absorbers showing good compatibility with benzothiazine dyes are useful when such dyes are incorporated within a polymer matrix layer. Examples of available benzotriazole UV light absorbers include 2-(2H-benzotriazol-2-yl)-4,6-bis(1-methyl-1-henylethyl)phenol, sold under the trade name "Tinuvin 234" by Ciba-Geigy; and 2-(4,6-diphenyl-1,3,5-triazine-2-yl)-5(hexyl)oxyphenol sold commercially by Ciba-Geigy as "Tinuvin 1577".

Examples of commercially available benzophenone UV light absorbers include 2-hydroxy-4-n-octoxybenzophenone commercially available from Great Lakes Chemical Corporation under the trade name "Lowilite 22", 2,2-dihydroxy-4,4-dimethoxybenzophenone available under the trade name "Uvinul 3049" from BASF; and 2,2',2,4'-tetrahydroxybenzophenone available under the trade name "Uvinul 3050" from BASF. It has been found that these benzophenone type of UV absorbers are particularly useful for a fluorescent colored acrylic matrix.

An example of an oxalanilide UV absorber is 2-ethyl,2'-ethoxy-oxalanilide sold under the trade name "Sanduvor VSU" by Clariant. Other oxalanilide UV absorbers are available. Individuals skilled in the art will recognize that many other UV light absorbers exist and may be suitable for use in the present invention.

In general, hindered amine light stabilizers (HALS) have been found to be useful to delay fading of fluorescent dyes. Oligomeric or polymeric HALS compounds having molecular weights of about 1500 and greater provide enhanced fluorescence durability. A combination of UV absorber and HALS compound generally helps to further prevent color fading and enhances color durability. Particularly suitable HALS compounds are oligomeric hindered amine compounds from Great Lakes Chemical under the trade name "Lowilite 62", or "Tinuvin 622" available from Ciba-Geigy.

HALS compounds include: dimethyl succinate polymer with 4-hydroxy-2,2,6,6-tetramethyl-1-piperidineethanol commercially available from Ciba Specialty Additives as "Tinuvin 622"; poly[[6-[(1,1,3,3,-tetramethyl butyl) amino]-s-triazine-2,4-diyl][[(2,2,6,6,-tetramethyl-4-piperidyl) imino] hexamethylene [(2,2,6,6-tetramethyl-4-piperidyl) imino]] commercially available from Ciba Specialty Additives under the trade name Chimassorb 944; "Tinuvin 791" which is available from Ciba Specialty Additives and is a blend of poly[[6-1,1,3,3,-tetramethylbutyl)amino]-s-triazine-2,4-diyl][[(2,2,6,6,-tetramethyl-4-piperidyl)imino] hexamethylene [(2,2,6,6-tetramethyl-4-piperidyl)]imino]] and bis(2,2,6,6-tetramethyl-4-piperidynyl)sebacate; and "Hostavin N30" available from Clariant. Those skilled in the art will recognize that many other hindered amine light stabilizers exist and may be suitable for use in the present invention.

When provided, the cover or cap layer can further enhance fluorescence durability of the articles by providing an ultraviolet light screening layer having an ultraviolet light absorbing compound or compounds incorporated into this layer. Alternatively, the cap or cover layer can include a polymer which is itself an absorber of ultraviolet light. A polyarylate matrix is suitable in this regard.

Absent a cap or cover layer, the invention provides durable fluorescent articles with desired colors. In the preferred arrangement, two colored fluorescent films create one durable fluorescent article. Each such film contains a fluorescent dye and UV additives within a polymer matrix. The overlayer is a relatively durable colored fluorescent film, and the underlayer is a colored fluorescent film of any satisfactory type. When joined together, they achieve the desired fluorescent color. Each color alone need not provide the required fluorescent coloration.

With the respective dyes within separate polymer matrices, any negative interaction which otherwise would be expected due to blending two dyes together is eliminated. Another advantageous property is that the overlayer has UV screening properties provided for the underlayer which are stronger compared to a conventional UV screening layer such as a cap or cover layer. The combination of the overlayer and underlayer according to the invention provides a superior light stable fluorescent article with a color which can be tailored to vary from fluorescent colors available from dye manufactures. Each single film alone cannot achieve these properties.

When a fluorescent yellow green retroreflective sheeting is required for particular uses, such as for extremely visible school zone or pedestrian crossing signs, a preferred embodiment combines two layers, neither of which would be suitable by itself to provide this type of signage. In this preferred arrangement, the overlayer is an acrylic matrix having a benzoxanthene dye, and the underlayer is a polycarbonate matrix having a benzothiazine dye. When assembled as a single article, a highly durable and properly colored signage article with needed chromaticity is provided.

More particularly, it has been determined that an acrylic matrix having a benzoxanthene dye has three distinct issues when used alone. Its yellow green color does not provide coloration in terms of chromaticity which meets industry accepted criteria. While its fluorescence properties are excellent, its coloration is outside of the target chromaticity, having excessive green tones. In addition, it has been determined that impact modifiers, typically important for acrylics in many uses such as outdoor signage, negatively impact the light stability of benzoxanthene dyes within acrylics. However, without impact modifiers, acrylic films typically are too brittle to be used in retroreflective sheeting applications. Handling during processing or installation would potentially crack or otherwise damage the acrylic-based sheeting. Moreover, even acrylics which have been found to achieve good light stability, alone have been found to be insufficient for extended long-term outdoor use.

With more particular regard to the deficiencies of the individual layers of the preferred yellow green embodiment for outdoor signage uses, the benzothiazine dye in polycarbonate matrix experiences issues which make it inadequate to be used outside of the combination according to the invention. This polymer and dye combination does not fluoresce to the degree needed for this application. Although its chromaticity is suitable for applications such as school zone crossing signs, its daytime luminescence parameter, known as "Y %" in the art, is too low. In addition, polycarbonate resin films are not sufficiently light stable for extended long term applications without some sort of protective coating, laminate or UV screening layer. Furthermore, it has been determined that, although benzothiazine dyes could find some protection with acrylic materials, their light fastness actually is lower when they are within an acrylic polymeric material than within polycarbonate.

When combined as the preferred overlayer and underlayer according to the invention, all of these issues have been resolved in an extremely advantageous fashion. The fluorescent sheeting having multiple layers achieves the target fluorescent color, such as yellow green color, while the high degree of benzoxanthene fluorescing offsets the lower fluorescence contributed by the benzothiazine dye. That is, the resulting coloricity and daytime luminescence factor "Y %" are nearly identical to the target values. Surprisingly, these effects achieve more than an averaging of values provided by the respective overlayer and underlayer.

Figure 7:
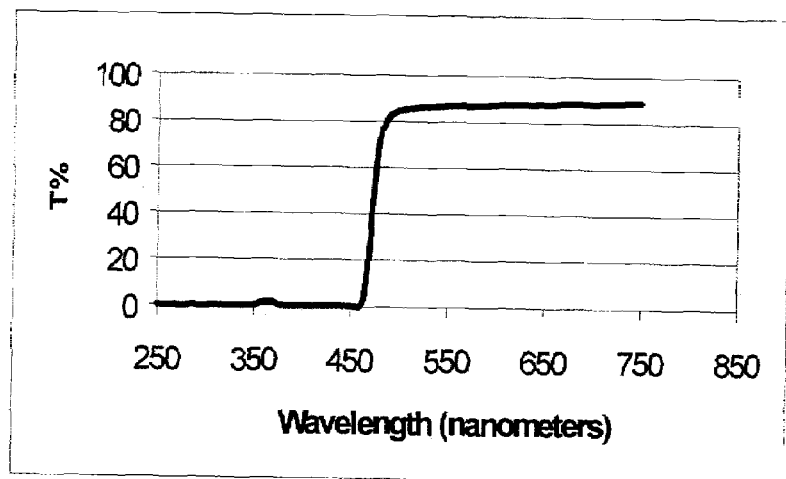
FIG. 7 is a light transmission curve illustrating the light blocking effect of a film component according to the invention.

In addition, although the light stability of the preferred overlayer alone is not suitable for use in long term retroreflective sheeting applications, the exceptional light stability provides a very light stable multiple film fluorescent sheeting. It also has been determined that the overlayer of the preferred benzoxanthene containing acrylic matrix acts as a UV light absorbing layer for the underlayer and protects same from UV light degradation. This is illustrated by FIG. 7, discussed further in Example 5, in the context of a yellow-green fluorescent sheeting.

Furthermore, the structural issue for acrylic matrices which do not include impact modifiers is very satisfactorily addressed by the presence of the underlayer. The underlayer typically is a polymer which is very strong and impact resistant to support the overlayer polymer, resulting in a laminate which is not brittle. Particularly, in the preferred embodiment, the polycarbonate matrix of the underlayer acts as a support layer for the polyacrylic overlayer. The result is a multiple film fluorescent sheeting which is not too brittle for uses exhibiting abusive conditions, such as outdoor signage and the like.

Thicknesses of the overlayer 22, of the underlayer 23, and of the cap layer 25 (when provided) can vary somewhat depending upon the particular article being prepared. Typically, the overlayer will have a thickness of between about 2 mils and about 20 mils (0.05 mm to 0.5 mm), more typically between about 3 mils and about 10 mils (0.075 mm to 0.25 mm). A typical underlayer will have a thickness of between about 2 mils and about 20 mils (0.05 mm to 0.5 mm), more typically between about 3 mils and about 10 mils (0.075 mm to 0.25 mm). When a cap layer is included, its thickness ranges between about 1 mil and about 10 mils (0.025 mm to 0.25 mm), more typically between about 2 mils and about 5 mils (0.05 mm to 0.125 mm).

The following Examples are provided for purposes of illustration and explanation. The films used in these Examples were made using a laboratory Killion single screw extruder with three heating zones or with the use of a Brabender mixer. In the single screw extruder set up, a mixture of the indicated polymer resins, the indicated dye and other additives such as UV light stabilizer and/or HALS was extruded into a film of about 6 mils (0.15 mm) thick. As an example, for the acrylic matrix film, the temperature zone settings were at 490° F., 460° F. and 440° F. For polycarbonate film, the temperature zone settings typically were at 530° F., 540° F. and 550° F. The screw speed was 27 rpm. When the mixer was used, the equipment was a C. W. Brabender Plasti-Corder Prep-Mixer. The material was compounded through melt mixing of polymer resins and other components and then converted into films of approximately 6 mils (0.150 mm) using a heated platen press. Mixing temperatures were between 230° C. and 270° C., depending upon the particular polymer resin, and the mixing speed was 100 rpm for a time of between about 3 and about 6 minutes. The thus prepared different films were laminated together at about 185° C. using a Hot Roll Laminator M from Cheminstruments.

EXAMPLE 1

An overlayer film of a polymethyl methacrylate matrix was prepared by blending an acrylic resin (Acrylite Plus ZK-V-001E, a Cyro trade designation), 0.8 weight percent benzoxanthene fluorescent dye (Lumofast Yellow 3G, a DayGlo trade designation), together with 1.0 weight percent UV absorber (Lowilite 22, a Great Lakes Chemical trade designation), and 0.5 weight percent HALS (Lowilite 62, a Great Lakes Chemical trade designation). This single-layer PMMA was designated Sample 1-1.

A polycarbonate matrix underlayer film was made by blending polycarbonate resin (Calibre 303EP, a Dow Chemical designation) with 0.06 weight percent benzothiazine fluorescent dye (Huron Yellow D-417, a DayGlo trade designation). This single polycarbonate (PC) film was designated as Sample 1-2-1. Sample 1-2-2 was a multiple film laminate of Sample 1-1 on Sample 1-2-1.

Another PC underlayer film was prepared from the same polycarbonate resin as sample 1-2-1, together with 0.05 weight percent Huron Yellow D-417 fluorescent dye, and 1.5 weight percent UV absorber (Tinuvin 1577, a trade designation of Ciba Geigy). This was designated as Sample 1-3-1. Sample 1-3-2 was a multiple layer film of Sample 1-1 laminated on Sample 1-3-1.

A further PC underlayer film was prepared using the same polycarbonate resin, this time combined with 0.05 weight percent Huron Yellow D-417 fluorescent dye, 1 weight percent Tinuvin 1577 UV absorber, and 0.3 weight percent HALS component (Tinuvin 622, a trade designation of Ciba Geigy). This was Sample 1-4-1. Sample 1-4-2 was the Sample 1-1 PMMA film laminated on this Sample 1-4-1 film.

Another PC underlayer film was prepared. This was composed of polycarbonate resin (Calibre-302, a trade designation of Dow Chemical), 0.08 weight percent Huron Yellow D-417, and 0.3 weight percent HALS component (Tinuvin 622). This was Sample 1-5-1 Sample 1-5-2 was a lamination of film Sample 1-1 on film Sample 1-5-1.

Each of the five single films identified above and each of the four two layer laminated films was subjected to accelerated weathering testing. Each sample was placed into a Xenon Arc accelerated "Weather-O-Meter", and the amount of fading was monitored through routine color measurements on a HunterLab LS-6000 calorimeter. The instrument used a D65 light source, 20° observer and a 0/45 geometric configuration, and all color measurements were recorded in terms of the CIE 1931 Standard Colorimetric System. To determine the extent of fading and color shifts, the $\Delta E^*$ degree of color shift versus time of artificial weathering was determined. A small value of the $\Delta E^*$ color shift, such as a shift of about 2 or 3 $\Delta E^*$ units is barely detectible to the human eye. The test methodology used for the Xenon arc weathering is outlined in ASTM G26-90, Section 1.3.. Borosilicate inner and outer filters were used, and the irradiance level was set to 0.35W/m² at 340 nm.

Results were recorded with respect to the CIELAB color difference, measuring $\Delta E^*$. The $\Delta E^*$ values at three different accelerated weathering times, namely 500 hours, 1000 hours and 1500 hours, were determined for certain momolayer and two-layer films. These data are reported in Table I.

TABLE I

| Sample | Film Structure | $\Delta E^*$ of Samples Exposed at Indicated Period of Time (Hours) | | |
|---|---|---|---|---|
| | | 500 | 1000 | 1500 |
| 1-1 | Single PMMA film | 23.04 | 21.45 | 21.63 |
| 1-2-1 | Single PC film | 9.89 | 12.26 | 11.96 |
| 1-2-2 | PMMA/PC two layer | 3.36 | 2.48 | 4.89 |
| 1-3-1 | Single PC film | 8.04 | 10.74 | 12.64 |
| 1-3-2 | PMMA/PC two layer | 4.51 | 3.90 | 6.89 |

TABLE I-continued

| Sample | Film Structure | $\Delta E^*$ of Samples Exposed at Indicated Period of Time (Hours) | | |
|---|---|---|---|---|
| | | 500 | 1000 | 1500 |
| 1-4-1 | Single PC film | 5.27 | 8.76 | 5.62 |
| 1-4-2 | PMMA/PC two layer | 5.03 | 4.05 | 7.84 |
| 1-5-1 | Single PC film | 4.54 | 11.48 | 11.47 |
| 1-5-2 | PMMA/PC two layer | 2.77 | 3.00 | 3.99 |

Figure 8:
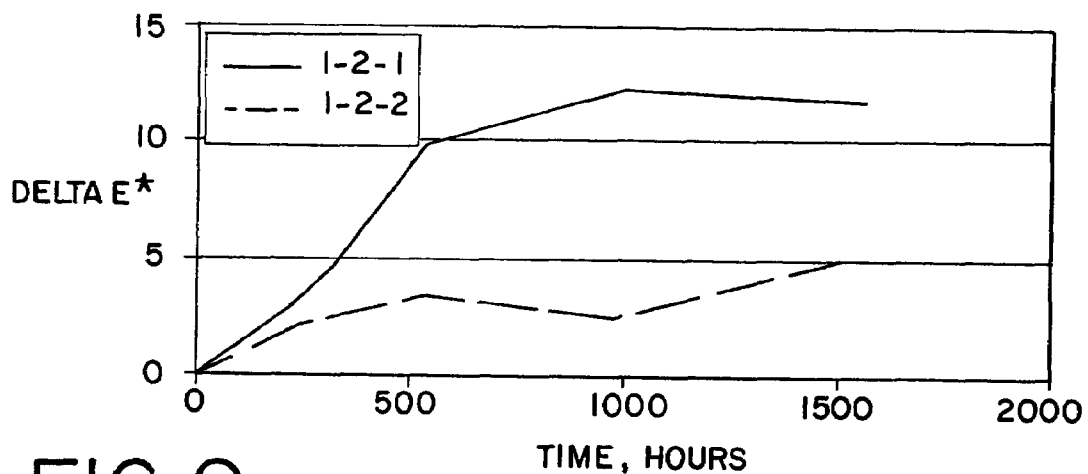
FIG. 8 is a plot of degree of color shift versus time of accelerated or artificial weathering, illustrating different exposure effects for a particular film and for that film having a fluorescent polymer matrix overlay.
Figure 9:
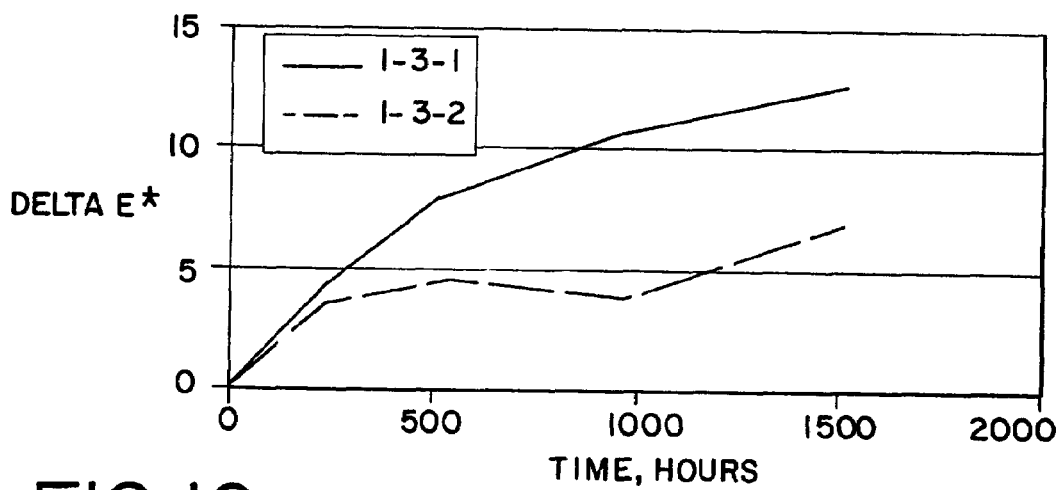
FIG. 9 is a plot of degree of color shift versus time of accelerated or artificial weathering, illustrating different exposure effects for a particular film and for that film having a fluorescent polymer matrix overlay, with the underlying film including a UV absorber.
Figure 10:
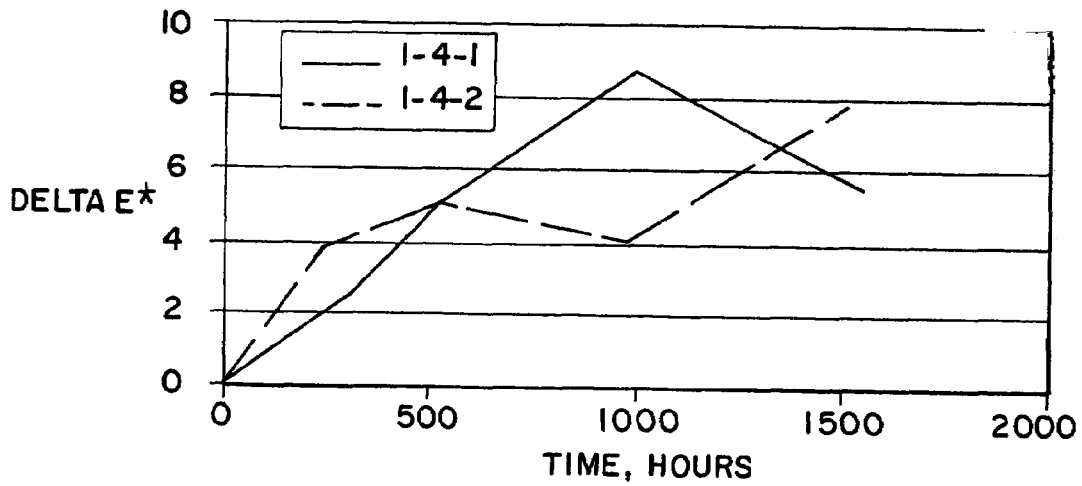
FIG. 10 is a plot of degree of color shift versus time of accelerated or artificial aging, illustrating different exposure effects for a particular film and for that film having a fluorescent polymer matrix overlay, the underlayer including a UV absorber and a HALS component.
Figure 11:
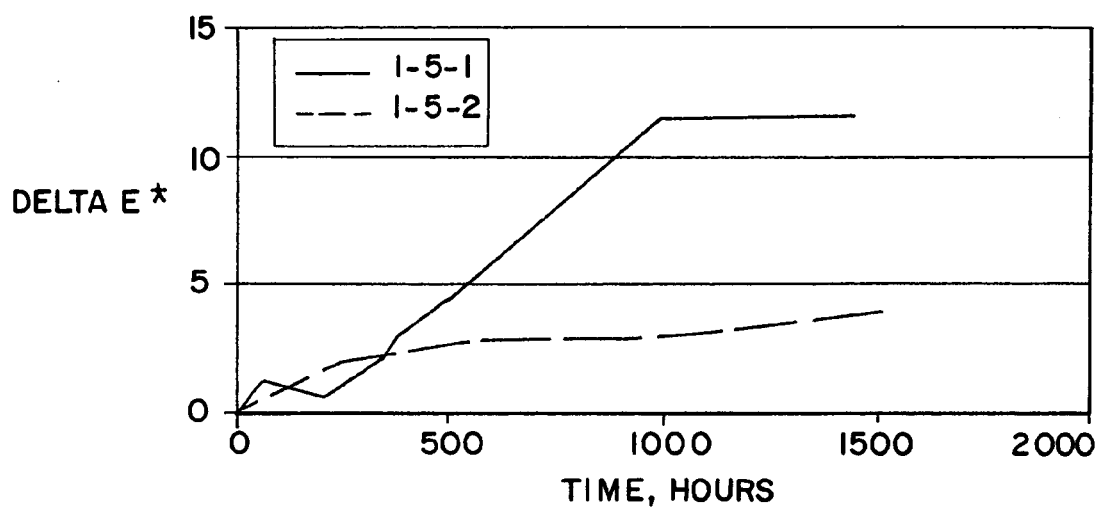
FIG. 11 is a plot of degree of color shift versus time of accelerated or artificial aging illustrating different exposure effects for a particular film and for that film having a fluorescent polymer matrix overlay, the underlayer including a HALS component.

The Table I data show that large color shifts were indicated for the single film components. The two layer films showed improved durability of fluorescent properties when compared with the individual single layer films. This can be seen in FIG. 8, which plots the $\Delta E^*$ value versus time of accelerated weathering for the single PC film 1-2-1 and for the PMMA/PC two layer film 1-2-2. The same type of plot is provided in FIG. 9 for single PC film 1-3-1 and four two layer PMMA/PC film 1-3-2. FIG. 10 plots the Table I data for single PC film 1-4-1 and for two layer PMMA/PC film 1-4-2. FIG. 11 plots the weathering data for single PC film 1-5-1 and for the two layer PMMA/PC film 1-5-2, the weathering being particularly minimal for this two layer film. These data demonstrate the durability of fluorescence and of color which are substantially enhanced when the multiple film layer approach is used in comparing $\Delta E^*$ values of the multiple film structure to the single layer film components.

EXAMPLE 2

A single layer polymethyl methacrylate film matrix was prepared by combining an acrylic resin, namely Acrylite Plus ZK-V-001E, a trade designation of Cyro, having incorporated thereinto 0.8 weight percent Lumofast Yellow 3G fluorescent dye from DayGlo. This was designated as Sample 2-1. A single polycarbonate matrix film was prepared from Calibre 303EP pellets of Dow Chemical with 0.05 weight percent Huron Yellow D-417 fluorescent dye and 1.5 weight percent Tinuvin 1577 UV absorber. This was designated as Sample 2-2. Sample 2-3 was a two layer PMMA/PC film of Sample 2-1 laminated on Sample 2-2.

Testing was conducted to determine chromaticity and "Y %" for these three film Samples. These are shown in Table II.

TABLE II

| Sample | Film Structure | x | y | Y % |
|---|---|---|---|---|
| 2-1 | Single PMMA film | 0.3706 | 0.5034 | 94.15 |
| 2-2 | Single PC film | 0.4220 | 0.5050 | 82.53 |
| 2-3 | PMMA/PC two layer | 0.4152 | 0.5254 | 89.62 |

The CIE "x" and "y" color chromaticity coordinates are useful to compare these films with a color standard used and acknowledged in the art. They can be compared with those of a target fluorescent yellow green which meet the chromaticity requirements of the industry. These color coordinates for fluorescent yellow green are: (0.387, 0.610), (0.460, 0.540), (0.421, 0.486) and (0.368, 0.539).

Figure 5:
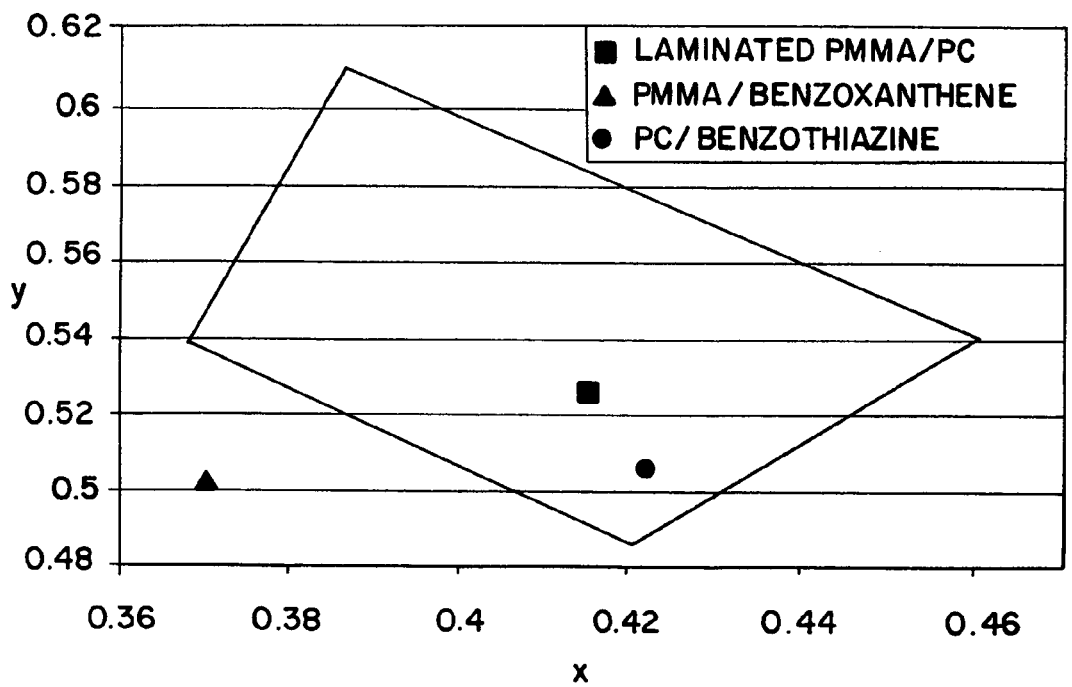
FIG. 5 is a plot of "x" and "y" color chromaticity values in terms of the CIE 1931 Standard Colorimetric System for film structures with respect to an overlay of target fluorescent yellow-green values.

FIG. 5 provides a plot of the fluorescent yellow green color box required of the industry, as defined by these "x", "y" color coordinates noted above. Films exhibiting chromaticity coordinates ("x" and "y") within this defined box can be considered to be generally acceptable.

The "Y %" coordinate is in a third dimension, which can be visualized as projecting above the two dimensions of the FIG. 5 two dimensional box. Generally, a larger "Y %" indicates a greater degree of fluorescence and thus greater desirability in the present context. The "Y %" value is a total luminance factor. It is a standard measure of the amount of light (electromagnetic radiant power which is visually detectible by the normal human observer) radiating from a surface weighted by the eye's efficiency to convert the light to luminous sensation. It is defined as the ratio of the total luminance of a specimen to that of a perfect diffuser illuminated and viewed under the same conditions.

From FIG. 5, it is clear that the single PMMA film did not fall within the "x" and "y" coordinates of the fluorescent yellow-green color box, and the single PC film gave borderline within-the-box coordinates. Surprisingly, the 2-layer film made of these two films having unacceptable or marginally acceptable "x" and "y" coordinates provided a two layer film which is much more comfortably within the target "x" and "y" coordinates. It is of interest that the x value is not merely an average of the "x" values of the two films from which it is made. Even more surprising, the "y" value is higher than for either single film, which is critical to maintaining the color inside the required color box during weathering. For example, in the case of the single PC film, a small color shift upon weathering will put the color of this film outside of the required color box.

Concerning the "Y %" parameter, the two layer film provides a fluorescent yellow green shading with favorable values. It is noted that the "Y %" of the two layer film is greater than the average of the two "Y %" values for the individual films.

EXAMPLE 3

The films of Example 2 were converted into retroreflective road sign sheeting through the use of a well-known embossing technique to provide a structure as generally shown in FIG. 1. For this embossing process, a plurality of microprismatic corner cube elements were formed directly into the rear surface of the fluorescent film. Then, a finished retroreflective sheeting was made by bonding a white backing film to the embossed film in a repeating cellular pattern.

The color coordinates ("x", "y") and luminance factor ("Y %") values of the finished retroreflective sheeting are shown in Table III. For comparison of purposes, the "x", "y" and "Y %" values of commercial fluorescent yellow green products also are shown. Especially interesting in this regard is the "Y %" value for the two color layer PMMA/PC product. Its "Y %" is higher than either color film which it contains, and it is closer to the commercial products than to the individual films.

TABLE III

| Retroreflective Sheeting Type | x | y | Y % |
| --- | --- | --- | --- |
| Avery Dennison T-7513 Fluorescent Yellow-Green | 0.4076 | 0.5641 | 92.94 |
| 3M 3983 Fluorescent Yellow Green | 0.4069 | 0.5704 | 95.28 |
| PMMA single color film | 0.3404 | 0.5260 | 85.95 |
| PC single color film | 0.4302 | 0.5417 | 83.9 |
| PMMA/PC two color layer | 0.4067 | 0.5433 | 89.75 |

Figure 6:
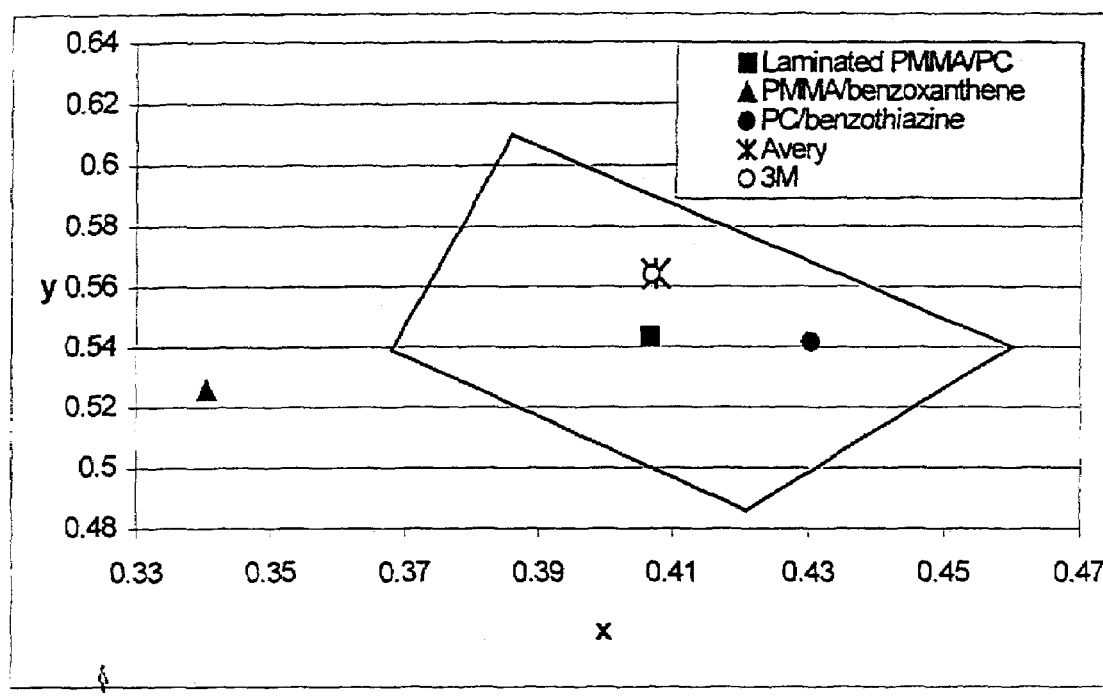
FIG. 6 is a plot of "x" and "y" color chromaticity values in terms of the CIE 1931 Standard Colorimetric System for retroreflective sheeting types with respect to an overlay of target fluorescent yellow-green values.

The "x" and "y" values of Table III are plotted in FIG. 6 and in association with the same industry standard fluorescent yellow green color box of FIG. 5. The coordinates for the non-comparison products are somewhat different in FIG. 6 than those for the same films in FIG. 5. This illustrates an expected shifting between the coordinates displayed by raw films and by those converted into retroreflective road sign sheeting. As can be noted from TABLE III and from FIG. 6, the two color layer product according to the invention has chromaticity and "Y %" o values which are close to those of existing products, which can be considered to be standards to attempt to achieve in this type of product. Neither of the single layer products from which the two layer product is made would be suitable by itself to achieve a fluorescent yellow green retroreflective sheeting with the desired color and "Y %" coordinates. The chromaticity of retroreflective sheetings made from either of these single fluorescent yellow green PMMA layers or PC layers is far away from those of the existing products which provide the desired target for this article.

EXAMPLE 4

Two single layer films were prepared with the same fluorescent dye, namely 0.06 weight percent Huron Yellow D-417. One of the polymer matrices was a polycarbonate, Calibre 303-EP, while the other polymer was an acrylic matrix made from Acrylite Plus ZK-V-001E. The polymethyl methacrylate showed excessive fading after only 200 hours of accelerated weathering, the $\Delta E^*$ being 36.70, indicating that the light stability of the fluorescent dye in the host acrylic matrix was very poor. Contrary to this result, the same benzothiazine dye showed much better light stability in the polycarbonate resin, indicating that it is a suitable host for this fluorescent dye. At 200 hours of accelerated aging, the $\Delta E^*$ was only 2.55. At 500 hours, it was 9.89, and at 1000 hours, the $\Delta E^*$ was 12.26 for the polycarbonate film.

EXAMPLE 5

A polymethyl methacrylate film of 6 mils thickness was prepared. It contained 0.8 weight percent of Lumofast Yellow 3G dye, 1.0 weight percent of Lowilite 22 UV absorber, and 0.5 weight percent Lowilite 62 HALS component. Light transmission data were recorded. They are plotted in FIG. 7 as a light transmission curve. It is noted that almost all of the light below 460 nm was blocked by the film due to the presence of the dye and the UV absorber. This Example indicates that the fluorescent yellow green PMMA film is a strong light screener for other fluorescent colored films, illustrating its effectiveness as an overlayer in accordance with the invention.

EXAMPLE 6

A fluorescent yellow green overlayer film was prepared with the same formulation as Sample 1-1 in Example 1. This polymethyl methacrylate film was designated as Sample 4-1. A fluorescent orange PMMA underlayer film was made by blending acrylic resin pellets (Atohaas VO-45, a trade designation of Atohaas) with an orange fluorescent thioxanthene dye, namely 0.25 weight percent of Marigold Orange D-315, a trade designation of DayGlo, 1 weight percent Tinuvin 234 UV absorber and 0.5 weight percent Tinuvin T-144 UV absorber. This was designated as Sample 4-2-1. A two layer article was prepared by laminating Sample 4-1 film on a Sample 4-2-1 film. This was designated as sample 4-2-2.

Another fluorescent orange underlayer film was prepared in a PMMA matrix. The acrylic resin was Plexiglas PSR-9, a trade designation of Atofina, with perylene imide fluorescent dyes from BASF, namely 0.2 weight percent Lumogen F Orange 240 and 0.025 weight percent Lumogen F Red 300. This was designated as Sample 4-3-1. A two layer film was prepared by laminating the Sample 4-1 overlayer on the Sample 4-3-1 underlayer. This was designated as a Sample 4-3-2.

Each of the three single layer films and both of the two layer articles were subjected to accelerated aging generally in accordance with Example 1. The results are reported in Table IV.

TABLE IV

| Sample | Film Structure | ΔE* of Samples Exposed at Indicated Period of Time (Hours) | | |
|---|---|---|---|---|
| | | 500 | 1000 | 1500 |
| 4-1 | Single PMMA FYG Film | 23.04 | 21.45 | 21.63 |
| 4-2-1 | Single VO-45 FO Film | 25.4 | 31.32 | 36.94 |
| 4-2-2 | PMMA FYG/VO-45 FO two layer | 10.06 | 22.33 | 24.38 |
| 4-3-1 | Single PSR-9 FO Film | 5.79 | 11.82 | 25.75 |
| 4-3-2 | PMMA FYG/PSR-9 FO two layer | 3.23 | 2.51 | 6.71 |

Figure 12:
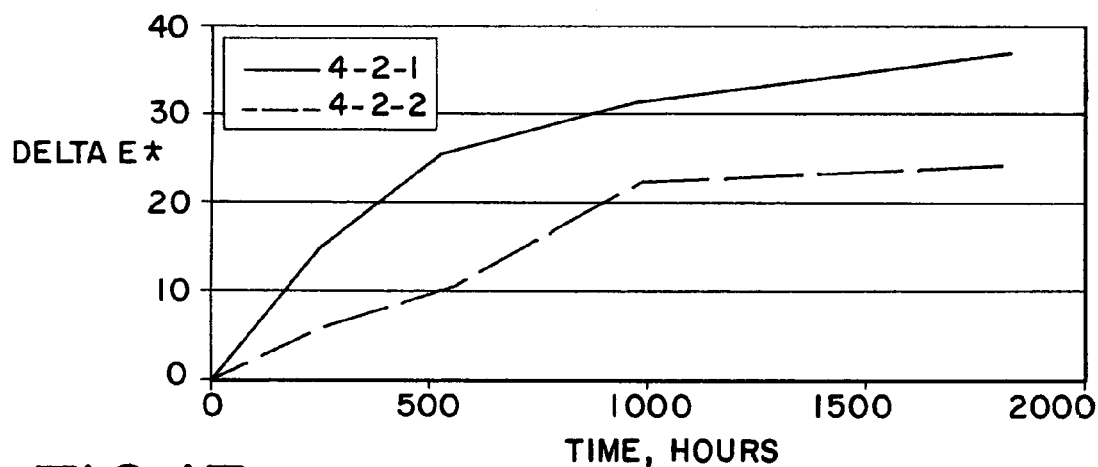
FIG. 12 plots degree of color shift versus time of accelerated or artificial aging for a single-layer yellow-green fluorescent acrylic film, as well as for sheeting having this film as an overlayer onto a polymer matrix containing orange dye.
Figure 13:
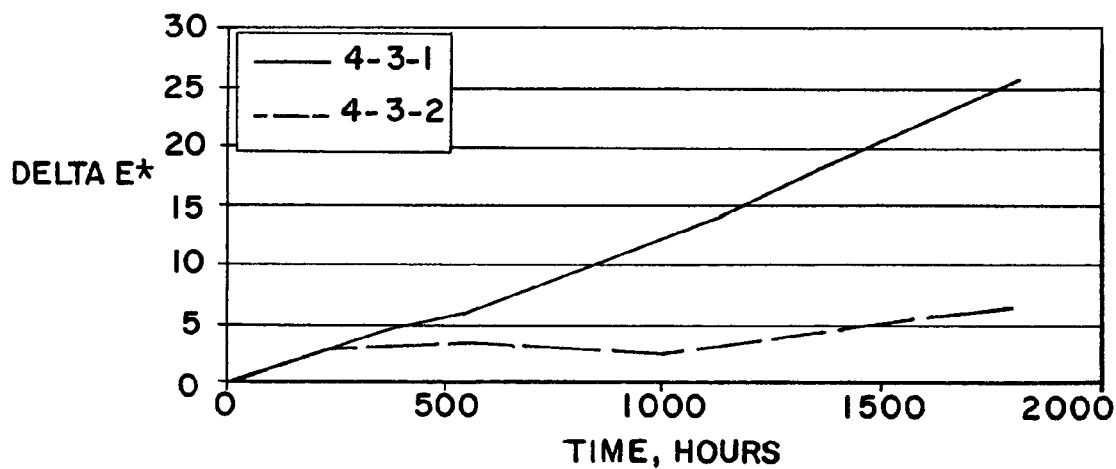
FIG. 13 plots degree of color shift versus time of accelerated or artificial aging for a single-layer yellow-green fluorescent acrylic film, as well as for sheeting having this film as an overlayer onto a polymer matrix containing an orange dye different from that of FIG. 12.

The ΔE* generated from this Xenon Arc weathering test of the single layer PMMA FYG film gave substantially consistent poor results. Single layer Sample 4-2-1 was consistently poor, and single layer Sample 4-3-1 did not withstand extended time weathering. However, both two layer articles gave better results, Sample 4-3-2 being particularly effective. FIG. 12 plots the Table IV results for the two samples containing the VO-45 FO film. FIG. 13 plots these results for the PSR-9 FO film containing articles.

EXAMPLE 7

Accelerated weathering results using QUV accelerated weathering was performed on two different two layer film structures. QUV is an accelerated weathering tester in which polymer samples are exposed under UV light. The light lamps used in the test emanated 340 nm light. The conditions used were based on ASTM G 53-88.

One of the film structures was a PMMA/PC two layer article, namely Sample 1-3-2 from Example 1. The other was Sample 4-3-2 from Example 6, a PMMA FYG/PSR-9 FO two layer article. The weathering results were very good. Sample 1-3-2 gave a ΔE* reading of 0.83 at 200 hours of accelerated exposure time, a ΔE* reading of 1.63 at 1500 hours, and a ΔE* reading of 3.23 at 3000 hours. For the Sample 4-3-2 article, the ΔE* reading at 200 hours was 1.27. At 1500 hours, the ΔE* reading was 3.8, and at 3000 hours, the ΔE* reading was 3.56. All of these indicate excellent light exposure durability.

EXAMPLE 8

A fluorescent yellow sheeting having multiple film layers is prepared. The overlayer is an acrylic matrix made from Acrylite Plus ZK-V-001E from Cyro, 0.8 weight percent of Lumofast Yellow 3G from DayGlo, 1 weight percent UV absorber, and 0.5 weight percent HALS component. The underlayer is an acrylic matrix made from Acrylite Plus Exp-140 from Cyro and 0.3 weight percent Lumogen F Orange 240 (a perylene dye from BASF). UV absorbers, if desired, are added, selected from Lowilite 22, Tinuvin 234, and Tinuvin P. A HALS component, selected from Lowilite 62 and Tinuvin 770, also maybe added as needed.

EXAMPLE 9

Another fluorescent yellow sheeting having multiple film layers is prepared. The overlayer is an acrylic matrix made from Acrylite Plus EXP-140 from Cyro, and 0.16 weight percent Lumogen F Orange 240 from BASF. The underlayer is an acrylic matrix made from Acrylite Plus EXP-140 and 0.3 weight percent Lumogen F Yellow from BASF. UV absorbers, if desired, are added, selected from Tinuvin 234, Tinuvin P, Uvinul 3049, and Lowilite 22. A HALS component, typically Lowilite 22, Tinuvin 770, and Tinuvin 622, also may be added as needed.

EXAMPLE 10

A fluorescent yellow green sheeting having multiple film layers is prepared. The overlayer is a polymer blend matrix containing polyarylate made from U-Polymer U-6000 from Unitika, Japan, and 0.8 weight percent Lumofast Yellow 3G from Day-Glo. No UV additive is needed. The underlayer is a polycarbonate matrix made from polycarbonate and 0.05% Huron Yellow D 417. No UV additive is needed.

EXAMPLE 11

A fluorescent yellow green sheeting having multiple film layers is prepared. The overlayer is a polymer matrix containing copolyestercarbonate, Sollx from GE, and 0.8 weight percent Lumofast Yellow 3G from Day-Glo. No UV additive is needed. The underlayer is a polycarbonate matrix made from polycarbonate and 0.05% Huron Yellow D 417. No UV additive is needed.

It will be understood that the embodiments of the present invention which have been described are illustrative of some of the applications of the principles of the present invention. Numerous modifications may be made by those skilled in the art without departing from the true spirit and scope of the invention.

The invention claimed is:

1. An article having fluorescent coloration comprising:
an underlayer colored fluorescent film having a benzothiazine dye within an underlayer polycarbonate matrix;
an overlayer colored fluorescent film having a benzoxanthene dye within an overlayer acrylic resin matrix;
said overlayer colored fluorescent film overlies said underlayer fluorescent colored film; and
the article has a selected fluorescent coloration different from the fluorescent coloration of either said underlayer colored fluorescent film or said overlayer colored fluorescent film, and said overlayer colored fluorescent film exhibits UV light screening properties in excess of any light screening properties of said underlayer colored fluorescent film.

2. The article in accordance with claim 1, wherein said selected fluorescent coloration is fluorescent yellow green having "x" and "y" chromaticity coordinates which are bounded by the following "x" and "y" chromaticity coordinates: (x=0.387, y=0.610), (x=0.460, y=0.540), (x=0.421, y=0.486) and (x=0.368, y=0.539).

3. The article in accordance with claim 1, wherein said fluorescent dye in said overlayer colored fluorescent has a greater daytime luminance factor "Y %" than said dye in said underlayer fluorescent film.

4. The article in accordance with claim 1, wherein said overlayer colored fluorescent film has greater light absorbing ability than said underlayer colored film, whereby color durability and UV light degradation protection for the article are enhanced when compared with the color durability and UV protection of either individual outerlayer or underlayer colored film.

5. The article in accordance with claim 1, wherein said dye in said underlayer fluorescent film is more light fast than said dye in said overlayer fluorescent film.

6. The article in accordance with claim 1, wherein said underlayer film is less brittle than said overlayer film.

7. The article in accordance with claim 1, wherein said underlayer film is less brittle than said overlayer film.

8. The article in accordance with claim 1, wherein said article has retroreflective members and said underlayer is between said overlayer and said retroreflective members such that incident light passes through said overlayer, then passes into said underlayer, then encounters said retroreflective members and retroreflects into said underlayer colored film and passes through said overlayer colored film and out of the article.

9. The article in accordance with claim 8, wherein said retroreflective members are formed into said underlayer.

10. The article in accordance with claim 8, wherein said retroreflective members are prismatic members.

11. The article in accordance with claim 8, wherein said retroreflective members are arranged to provide an encapsulated lens construction.

12. The article in accordance with claim 8, wherein said retroreflective members are arranged to provide an enclosed construction.

13. The article in accordance with claim 1, wherein said article is signage which is suitable for outdoor use for at least three years.

14. The article in accordance with claim 1, wherein said article is signage which is suitable for outdoor use for at least three years, and the overlayer film and underlayer film combine to provide yellow green coloration within the box defined by the following "x" and "y" chromaticity coordinates: (x=0387, y=0610), (x=0.460, y=0.540), (x=0.421, y=0.486) and (x=0.368, y=0.539).

15. The article in accordance with claim 1, wherein said underlayer polymer matrix and said overlayer polymer matrix include an acrylic.

16. The article in accordance with claim 1, further including a cap layer polymeric film overlying said overlayer colored fluorescent film, said cap layer having properties selected from the group consisting of abrasion resistance, graffiti resistance, dew resistance, and combinations thereof.

17. The article in accordance with claim 1, further including a cap layer film polymethyl methacrylate matrix, said cap layer providing UV light screening properties, and said overlayer is between said underlayer and said cap layer.

18. The article in accordance with claim 1, wherein said overlayer film absorbs substantial amounts of light in a substantial portion of a light spectrum between about 250 nm and about 450 nm.

19. The article in accordance with claim 1, wherein the article has a $\Delta E^*$ value after extended exposure to outdoor conditions which is substantially less than that of either said underlayer film or of said overlayer film.

20. The article in accordance with claim 1, further including a tight stabilizer selected from the group consisting of a UV absorber, a HALS component and combinations thereof said light stabilizer being within either or both of said underlayer and said overlayer.

21. The article is accordance with claim 1, wherein said underlayer colored fluorescent film and overlayer colored fluorescent film each are individually unsuitable to meet (IV light durability requirements and coloration compliance standards for outdoor signage having said selected fluorescent coloration, while said article meets said requirements and standards.

22. The article in accordance with claim 1, wherein the coloration of said underlayer colored fluorescent film is different from the coloration of said overlayer colored fluorescent film.

23. An article comprising:
an underlayer colored fluorescent film having a first fluorescent dye within an underlayer polymer matrix;
an overlayer colored fluorescent film having a second fluorescent dye within an overlayer polymer matrix, said overlayer colored fluorescent film has greater UV light stability than said underlayer colored film;
the article has said overlayer colored fluorescent film over said underlayer colored fluorescent film;
said article has a selected fluorescent coloration different from both said underlayer colored fluorescent film and said overlayer colored fluorescent film; and
wherein said underlayer polymer matrix is a polycarbonate, the fluorescent dye of said underlayer film is a benzothiazine dye, said overlayer polymer matrix is an acrylic resin, and said fluorescent dye of the overlayer is a benzoxanthene dye.

24. The article in accordance with claim 23, wherein said selected fluorescent coloration is fluorescent yellow green having the following "x" and "y" chromaticity coordinates which are bounded by the following "x" and "y" chromaticity coordinates: (x=0.387, y=0.610), (x=0.460, y=0.540), (x=0.421, y=0.486) and (x=0368, y=0.539).

25. The article in accordance with claim 23, further including a cap layer film of an acrylic resin, a polyarylate resin, a copolyestercarbonate resin, or combinations or copolymers thereof, said cap layer providing UV light screening properties, and said cap Layer overlies said overlayer.

26. The article in accordance with claim 23, wherein said fluorescent dye in said underlayer fluorescent film is more light fast than said dye in said overlayer fluorescent film.

27. The article in accordance with claim 23, wherein said underlayer film is less brittle than said overlayer film.

28. The article in accordance with claim 23, wherein said article has retroreflective members and said underlayer is between said overlayer and said retroreflective members such that incident light passes through said overlayer, then passes into said underlayer, then encounters said retroreflective member and retroreflects into said underlayer colored film and passes through said overlayer colored film and out of the article.

29. The article in accordance with claim 23, wherein said retroreflective members are formed into said underlayer.

30. The article in accordance with claim 23, wherein said retroreflective members are prismatic members.

31. The article in accordance with claim 23, wherein said retroreflective members are arranged to provide an encapsulated lens construction.

32. The article in accordance with claim 23, wherein said retroreflective members are arranged to provide an enclosed lens construction.

33. The article in accordance with claim 23, wherein said article is signage which is suitable for outdoor use for at least three years.

34. The article in accordance with claim 23, wherein said article is signage which is suitable for outdoor use for at lest three years, and the overlayer film and underlayer film combine to provide yellow green coloration within the box defined by following "x" and "y" chromaticity coordinates: (x=0.387, y=0.610), (x=0.460, y=0.540), (x=0.421, y=0.486) and (x=0.368, y=0.539).

35. The article in accordance with claim 23, wherein said underlayer colored fluorescent film and overlayer colored fluorescent film each are individually unsuitable to meet UV light durability requirements and coloration compliance standards for outdoor signage having said selected fluorescent coloration, while said article meets said requirements and standards.

36. The article in accordance with claim 23, wherein the coloration of said underlayer colored fluorescent film is different from the coloration of said overlayer colored fluorescent film.

37. An article comprising:
an underlayer colored fluorescent film having a first fluorescent dye within an underlayer polymer matrix;
an overlayer colored fluorescent film having a second fluorescent dye within an overlayer polymer matrix, said overlayer colored fluorescent film has greater UN light stability than said underlayer colored film;
the article has said overlayer colored fluorescent film over said underlayer colored fluorescent film;
said article has a selected fluorescent coloration different from both said underlayer colored fluorescent film and said overlayer colored fluorescent film; and
wherein said article is a yellow green fluorescent article, said underlayer polymer matrix is a polycarbonate, said first fluorescent dye is Huron Yellow D417 benzothiazine dye, said overlayer polymer matrix is a polymethyl methacrylate matrix, and said second fluorescent dye is Lumofast Yellow 3G benzoxanthene dye.

38. An article having yellow green fluorescent coloration comprising:
an underlayer colored fluorescent film having Huron Yellow D417 benzothiazine dye within an underlayer polycarbonate matrix;
an overlayer colored fluorescent film having a Lumoftst Yellow 3 benzoxanthene dye within an overlayer polymethyl methacrylate matrix;
said overlayer colored fluorescent film overlies said underlayer colored fluorescent film; and
the article has a selected fluorescent coloration different from the fluorescent coloration of either said underlayer colored fluorescent film or said overlayer colored fluorescent film, and said overlayer colored fluorescent film exhibits live light screening properties in excess of any light screening properties of said underlayer colored fluorescent film.

* * * * *